US012416275B2

(12) United States Patent
Klosterberg et al.

(10) Patent No.: US 12,416,275 B2
(45) Date of Patent: Sep. 16, 2025

(54) CYLINDER HEAD FOR AN INTERNAL COMBUSTION ENGINE WITH A COMBUSTION CHAMBER AND THE USE OF A SEALING SLEEVE TO SEAL OFF A CYLINDER HEAD

(71) Applicant: DEUTZ AKTIENGESELLSCHAFT, Cologne (DE)

(72) Inventors: Johannes Klosterberg, Swisttal (DE); Thomas Werner, Cologne (DE); Klaus-Peter Bark, Dürrholz (DE); Georg Töpfer, Cologne (DE); Manuel Hirmer, Cologne (DE)

(73) Assignee: DEUTZ AKTIENGESELLSCHAFT, Cologne (DE)

( * ) Notice: Subject to any disclaimer, the term of this patent is extended or adjusted under 35 U.S.C. 154(b) by 0 days.

(21) Appl. No.: 18/833,080

(22) PCT Filed: Jan. 23, 2023

(86) PCT No.: PCT/EP2023/000007
§ 371 (c)(1),
(2) Date: Jul. 25, 2024

(87) PCT Pub. No.: WO2023/143854
PCT Pub. Date: Aug. 3, 2023

(65) Prior Publication Data

US 2025/0116242 A1 Apr. 10, 2025

(30) Foreign Application Priority Data

Jan. 27, 2022 (DE) ..................... 10 2022 000 302.3

(51) Int. Cl.
*F02F 11/00* (2006.01)
*F02F 1/24* (2006.01)
*F02F 1/40* (2006.01)

(52) U.S. Cl.
CPC ............ *F02F 11/002* (2013.01); *F02F 1/242* (2013.01); *F02F 1/40* (2013.01)

(58) Field of Classification Search
CPC ... F02F 11/002; F02F 1/242; F02F 1/40; F16J 15/02; F16J 15/04; F16J 15/32
See application file for complete search history.

(56) References Cited

U.S. PATENT DOCUMENTS 3,334,617 A 8/1967 Palkowsky
6,112,722 A 9/2000 Barnhart et al.
(Continued)

FOREIGN PATENT DOCUMENTS

DE 102011001231 A1 9/2012
EP 1820957 A2 8/2007
(Continued)

OTHER PUBLICATIONS

International Search Report for corresponding application PCT/EP2023/000007 filed Jan. 23, 2023; Mail date May 8, 2023.
(Continued)

*Primary Examiner* — Grant Moubry
(74) *Attorney, Agent, or Firm* — CANTOR COLBURN LLP

(57) ABSTRACT

A cylinder head for an internal combustion engine with a combustion chamber, including a base body with a combustion chamber wall for closing off the combustion chamber of the internal combustion engine, the base body having a hole which penetrates the combustion chamber wall with a first opening and includes a contact section with a tapered inner contact surface; and a sealing sleeve which has a sealing section with a tapered outer sealing surface, wherein the sealing sleeve and the base body are clamped together in such a way that the contact surface and the sealing surface are in sealing contact, and wherein at least one of the contact
(Continued)

section and the sealing section is at least partially plastically deformed.

14 Claims, 6 Drawing Sheets

(56) References Cited

U.S. PATENT DOCUMENTS

| | | | | |
|---|---|---|---|---|
| 11,566,580 | B1 * | 1/2023 | Rexavier | F01P 3/16 |
| 2013/0167807 | A1 * | 7/2013 | Kamada | F02M 61/14<br>123/470 |
| 2018/0323583 | A1 * | 11/2018 | Niessner | H01T 21/02 |
| 2019/0379181 | A1 | 12/2019 | Hayashi | |

FOREIGN PATENT DOCUMENTS

| | | | |
|---|---|---|---|
| FR | 2875862 | A1 | 3/2006 |
| WO | 2021072458 | A1 | 4/2021 |

OTHER PUBLICATIONS

Feistich, Wikipedia, Version Dec. 17, 2021, https://de.wikipedia.org/wiki/Freestich [Jul. 27, 2022].

* cited by examiner

CYLINDER HEAD FOR AN INTERNAL COMBUSTION ENGINE WITH A COMBUSTION CHAMBER AND THE USE OF A SEALING SLEEVE TO SEAL OFF A CYLINDER HEAD

TECHNICAL FIELD

The present disclosure relates to a cylinder head for an internal combustion engine with a combustion chamber and the use of a sealing sleeve for sealing a cylinder head.

BACKGROUND

Cylinder heads close off the combustion chamber of internal combustion engines on the side opposite the piston. Intake and exhaust channels, oil channels for lubricating mechanically moving parts and coolant channels are integrated into cylinder heads. The cylinder head also carries the valves, the valve train and the injector and ignition devices. The injector and ignition devices are arranged in holes that extend through the cylinder head base body from a combustion chamber wall facing the combustion chamber to an opposite wall of the cylinder head base body. The aforementioned holes partially penetrate one or more of the oil ducts and coolant ducts. Appropriate sealing arrangements in the form of sleeves, into which the injector and ignition devices are inserted, prevent oil or coolant from mixing with each other or entering into the combustion chamber on the one hand and gases compressed by the piston from escaping from the combustion chamber through the holes on the other.

DE 10 2011 001 231 A1 discloses a sleeve for an internal combustion engine which is designed to accommodate a fuel injector and to be inserted into a receptacle of a cylinder head of the internal combustion engine. The sleeve has an outer conical contact surface which is in contact with an inner conical contact surface of the cylinder head.

BRIEF SUMMARY

The present disclosure proposes a cylinder head for an internal combustion engine with a combustion chamber which has an increased tightness with respect to the combustion chamber.

Particularly, a cylinder head is provided for an internal combustion engine with a combustion chamber, comprising a base body with a combustion chamber wall for closing off the combustion chamber of the internal combustion engine, the base body having a hole which penetrates the combustion chamber wall with a first opening and comprises a contact section with a tapered inner contact surface; and a sealing sleeve which has a sealing section with a tapered outer sealing surface, wherein the sealing sleeve and the base body are clamped together in such a way that the contact surface and the sealing surface are in sealing contact, and wherein at least one of the contact section and the sealing section is at least partially plastically deformed.

The contact between the contact surface and the sealing surface thus forms a first seal between the base body and the sealing sleeve.

The cylinder head according to the disclosure has the advantage that a possible leakage in the contact between the contact surface and the sealing section is eliminated by the at least partial plastic deformation of the contact section and/or sealing section due to the clamping of the sealing sleeve and base body. Furthermore, surface roughness, which leads to settling phenomena that can cause a loss of the sealing effect during the life cycle of the cylinder head, is eliminated by the plastic deformation of the contact section and/or sealing section when the sealing sleeve is installed in the base body. The clamping force between the base body and the sealing sleeve thus remains largely constant over the life cycle of the cylinder head and the sealing effect is permanently maintained.

The sealing sleeve can be made in one or more parts. In this respect, the sealing sleeve can also be referred to as a sealing sleeve arrangement.

In one possible embodiment, the sealing sleeve can be made of a material with a lower Brinell hardness than the base body. In this case, at least the sealing section of the sealing sleeve is at least partially plastically deformed. In particular, the sealing sleeve can be made of unalloyed or low-alloy structural steel. This has the advantage over frequently used copper sleeves, for example, that the sealing sleeve does not creep even at very high temperatures, which regularly occur on a cylinder head, particularly in the vicinity of the combustion chamber wall, so that the clamping force between the sealing sleeve and the base body and the resulting sealing effect are permanently maintained during the life cycle of the cylinder head.

In one possible embodiment, the base body can be made of a material with a lower Brinell hardness than the sealing sleeve. In this case, at least the contact section of the base body is at least partially plastically deformed. In particular, the base body can be made of a cast material, for example gray cast iron.

An injector arrangement or a spark plug arrangement can be accommodated in the sealing sleeve. The injector arrangement or the spark plug arrangement can be inserted into the core of the sealing sleeve and clamped to it via a thread. A sealing compression due to the clamping and/or a sealing element can be provided between the injector arrangement or the spark plug arrangement and the sealing sleeve.

In one possible embodiment of the cylinder head, the sealing sleeve can have an external thread that engages in an internal thread of the hole of the base body, so that the sealing sleeve and the base body are clamped together in such a way that the contact surface and the sealing surface are in sealing contact.

In a further embodiment, the contact section can be internally tapered and/or the sealing section can be externally tapered. It is also possible for the contact surface to be internally conical and/or the sealing surface to be externally conical.

Furthermore, in one possible embodiment, an extension of the sealing section with respect to a longitudinal axis of the hole can be smaller than an extension of the contact section. It is also possible that a contact area, in which the contact surface and the sealing surface are in contact, extends over part of the contact surface. This allows high surface pressures to be achieved, which lead to simplified plastic deformability on the one hand and an increased sealing effect on the other.

In a further embodiment, the sealing sleeve can have an undercut that adjoins the sealing section at its narrower end. This prevents contact between the sealing sleeve and the cylinder head base body outside the sealing contact between the contact surface and the sealing surface. The clamping force applied by the tensioning of the sealing sleeve and base body is thus transmitted in the area of the sealing contact between the sealing sleeve and the base body. This means that the surface pressure acting in the contact area can be increased, resulting in simplified plastic deformability on the one hand and an increased sealing effect on the other.

In one possible embodiment of the cylinder head, the cylinder head comprises a cylinder head cover which is connected to the base body so that an oil chamber is formed between the cylinder head cover and the base body, wherein the hole penetrates with a second opening an oil chamber wall of the base body. In this case, the sealing sleeve can extend into the oil chamber.

In one possible embodiment, the hole can extend through a coolant channel of the base body. In this case, the contact section of the hole can be arranged between the first opening penetrating the combustion chamber wall and the coolant channel of the base body. The contact between the contact surface and the sealing surface thus forms a first seal that seals the coolant duct against the side of the combustion chamber wall.

Furthermore, a second seal and a third seal can be provided between the sealing sleeve and the base body, which are each arranged between the coolant channel and the second opening of the hole.

In a further embodiment of the cylinder head, the cylinder head cover can comprise an insertion opening. In this case, the sealing sleeve can extend through the oil chamber and the insertion opening.

In one embodiment, the sealing sleeve can comprise a flange section via which the sealing sleeve is connected to the cylinder head cover, in particular clamped, so that the sealing sleeve is clamped to the base body in such a way that the first seal is formed between the contact surface and the sealing surface. In principle, it is therefore conceivable that the clamping force between the sealing sleeve and the base body is applied either by the clamping between the external thread of the sealing sleeve and the internal thread of the hole in the base body or by the clamping of the sealing sleeve with the cylinder head cover via the flange section. Alternatively, it is also conceivable that the clamping force between the sealing sleeve and the base body is applied in part by the clamping between the external thread of the sealing sleeve and the internal thread of the hole in the base body and in part by the clamping of the sealing sleeve with the cylinder head cover via the flange section.

The injector arrangement or the spark plug arrangement can be connected, in particular clamped, to the cylinder head cover together with the flange section via clamping means.

In a further possible embodiment, the sealing sleeve can comprise a flange element with the flange section and a sleeve element with the sealing section, which engage with one another so as to be displaceable in the direction of a longitudinal axis of the sealing sleeve, a fourth seal being provided between the flange element and the sleeve element.

In one possible embodiment, the sealing sleeve can comprise a flange element and a sleeve element with the sealing section, which engage with one another so as to be displaceable in the direction of a longitudinal axis of the sealing sleeve, the flange element being designed in one piece with the cylinder head cover. In other words, the flange element can be integrated into the cylinder head cover.

The disclosure further provides a use of a sealing sleeve for sealing a cylinder head, which has in a base body a hole with a contact section with an internally conical contact surface, relative to the combustion chamber of an internal combustion engine, the sealing sleeve having a sealing section with an externally conical sealing surface with a cone angle which is smaller than a cone angle of the internally conical contact surface.

The use of the sealing sleeve according to the disclosure initially results in edge support between the sealing surface and the contact surface during assembly, so that high local pressures occur, which lead to plastic deformation of at least one of the contact section and the sealing section. The plastic deformation seals leakage points and levels out unevenness that can lead to a loss of setting force, so that a high permanent sealing effect can be achieved.

In particular, the cone angle of the sealing surface of the sealing sleeve used differs by at least 0.5 degrees, in particular by at least 1 degree, from the cone angle of the internal conical contact surface. The cone angle of the sealing surface of the sealing sleeve used can differ by a maximum of 5 degrees, in particular by a maximum of 2 degrees, from the cone angle of the internal conical contact surface.

The sealing sleeve used can also have one or more of the properties described above in the context of the cylinder head.

BRIEF DESCRIPTION OF THE DRAWINGS

In the following, exemplary embodiments are explained on the basis of the drawings, in which.

DETAILED DESCRIPTION

Figure 1:
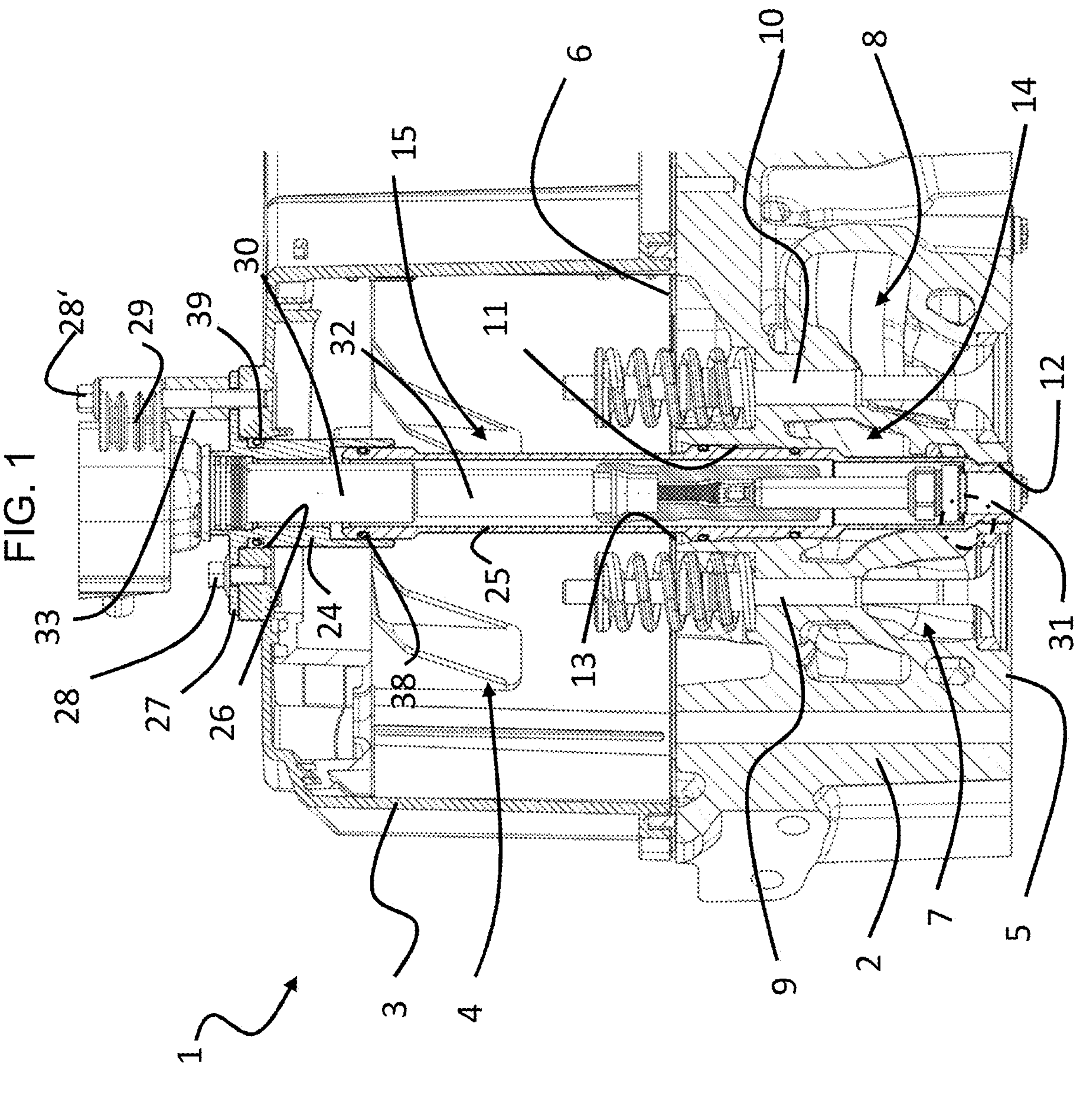
FIG. 1 is a sectional view of a cylinder head according to the disclosure according to a first embodiment.

FIGS. 1 to 4, which are described together below, show a cylinder head 1 comprising a base body 2 and a cylinder head cover 3. The cylinder head cover 3 is firmly connected to the base body 2 via connecting means not shown. The cylinder head cover 3 and the base body 2 enclose an oil chamber 4, in which a valve train with camshaft, not shown for the sake of clarity, is arranged.

The base body 2 has a combustion chamber wall 5, which can also be referred to as the flame deck. Opposite the combustion chamber wall 5 and oriented in the direction of the cylinder head cover 3, the base body 2 has an oil chamber wall 6.

The base body 2 is made of a cast material, with an inlet channel 7 and an outlet channel 8 cast into the base body 2. The inlet channel 7 and the outlet channel 8 each penetrate the combustion chamber wall 5. The inlet or outlet thus formed in the combustion chamber wall 5 can be optionally closed or opened by an inlet valve arrangement 9 or outlet valve arrangement 10 in the manner known to the skilled person. In the present case, the longitudinal axis of the inlet valve arrangements 9 is arranged parallel to the longitudinal axis of the exhaust valve arrangements 10. It is understood that the longitudinal axis of the inlet valve arrangement 9 and the outlet valve arrangement 10 can also be arranged at an angle to each other.

Furthermore, the base body 2 has a hole 11, which in this case is in the form of a bore. It is understood that the hole 11 could alternatively be cast directly into the base body 2. The hole 11 penetrates the combustion chamber wall 5 with a first opening 12 and the oil chamber wall 6 with a second opening 13. The hole 11 thus extends through the base body 2 from the first opening 12 to the second opening 13. Here, the hole 11 penetrates a coolant channel 14 through which coolant can flow to cool the cylinder head 1.

A sealing sleeve 15 is inserted into the hole 11 to seal the oil chamber 4 and the coolant duct 14 against the side of the combustion chamber wall 5. The sealing sleeve 15 extends through the hole 11 into the oil chamber 4 and from there through the cylinder head cover 3. The longitudinal axis of the sealing sleeve 15 is arranged parallel to the longitudinal axes of the inlet valve arrangement 9 and the exhaust valve arrangement 10.

The sealing sleeve 15 has a sealing section 16 with a tapered sealing surface 17. The sealing surface 17 thus extends along the longitudinal axis of the sealing sleeve 15 toward the combustion chamber wall 5 over gradually decreasing diameters. The narrow end of the sealing section 16 is adjoined by a shoulder 20 in the form of an undercut. The wide end of the sealing section 16 is adjoined by a shoulder 40, which is cylindrical in relation to the longitudinal axis. Alternatively, the shoulder 40 can be tapered toward the sealing section 16. The shoulder 40 and the sealing section 16 together form an outwardly bulged surface of the sealing sleeve 15.

The hole 11 has a contact section 18 with an also tapered contact surface 19. The sealing surface 17 and the contact surface 19 are in sealing contact with each other in a contact area. In addition, the tapered surfaces ensure that the sealing sleeve 15 is centered in the hole 11.

With respect to the longitudinal axis of the hole 11, the sealing section 16 has an extension (length) H16 that is smaller than the extension (length) H18 of the contact section 18. As a result, the contact area in which the sealing surface 17 and the contact surface 19 are in contact extends over a partial area of the contact surface 19. This prevents the sealing sleeve 15 from becoming jammed in the hole 11.

The sealing sleeve 15 has an external thread 34 at one end facing the combustion chamber wall 5, which is screwed into an internal thread 35 formed in the hole 11 and braced with this. The internal thread 35 is formed in the hole 11 between the combustion chamber wall 5 and the coolant duct 14. It is understood that the internal thread can also be located at a different position in the hole 11. For example, the internal thread can be arranged in the area of the hole 11 that lies between the coolant channel 14 and the second opening 13. The clamping force applied by the screw connection of the external thread 34 and internal thread 35 is supported in the contact area of the sealing surface 17 with the contact surface 19. The tensioning force is selected in such a way that at least one of the sealing section 16 of the sealing sleeve 15 and the contact section 18 of the base body 2 is plastically deformed by the tensioning force. The sealing sleeve 15 is made of a steel that has a lower Brinell hardness than the material of the base body 2. As a result, the sealing section 16 of the sealing sleeve 15 deforms plastically, while the contact section 18 of the base body 2 is deformed elastically. It is understood that, alternatively, the sealing sleeve 15 can be made of a material with a higher Brinell hardness than the material of the base body, so that the contact section 18 of the base body 2 is then plastically deformed, while the sealing section 16 of the sealing sleeve 15 is elastically deformed. In principle, it is also conceivable that both the sealing section 16 and the contact section 18 are plastically deformed.

Due to the plastic deformation of at least one of the sealing section 16 of the sealing sleeve 15 and the contact section 18 of the base body 2 by the tensioning force, potential leakage spots are filled by the plastically deformed material and surface roughness, which can lead to setting losses during operation of the cylinder head, is leveled. Overall, this results in a high sealing effect between the sealing sleeve 15 and the base body 2 during the entire life cycle of the cylinder head 1.

Figure 2:
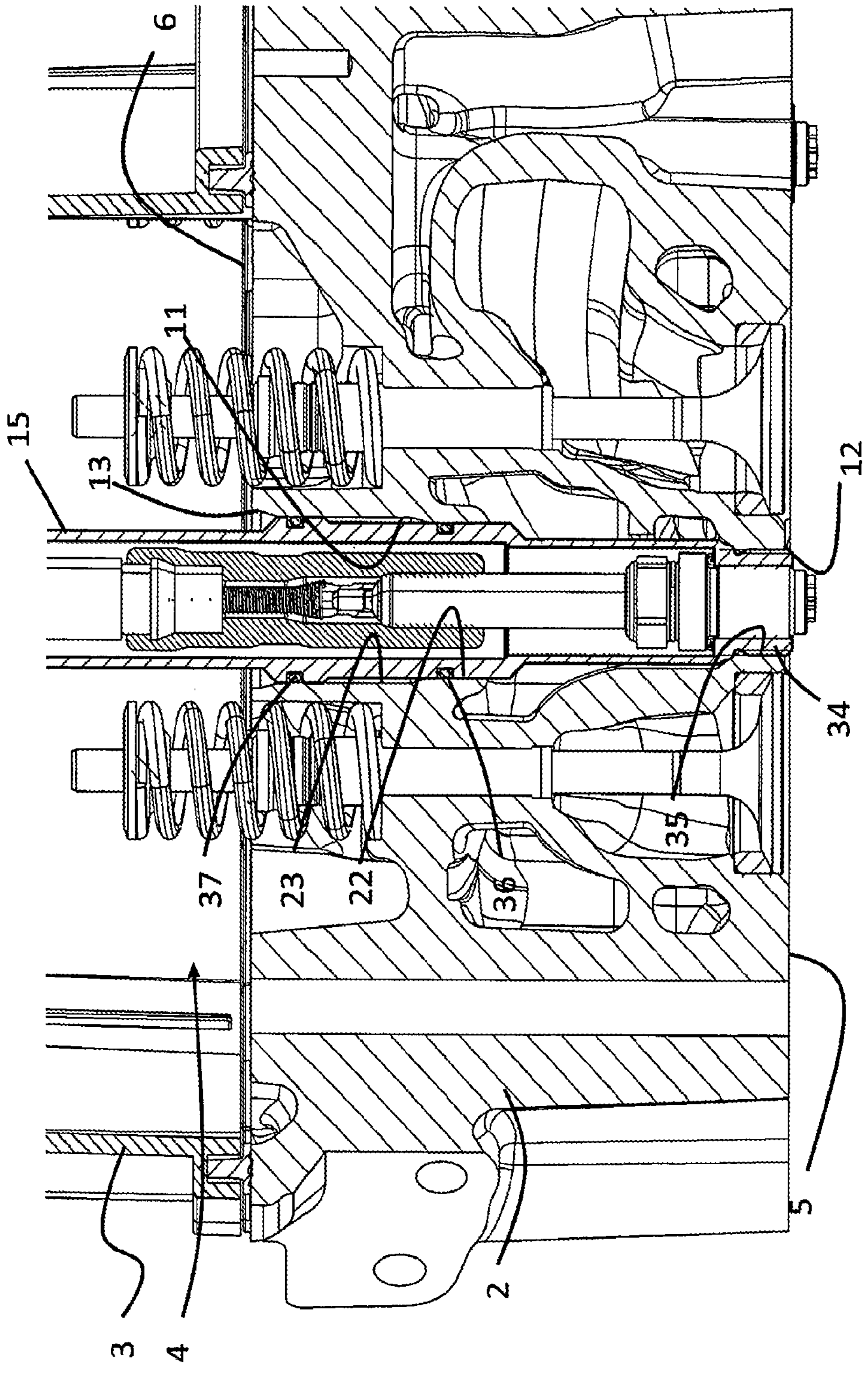
FIG. 2 is an enlarged section of FIG. 1.
Figure 4:
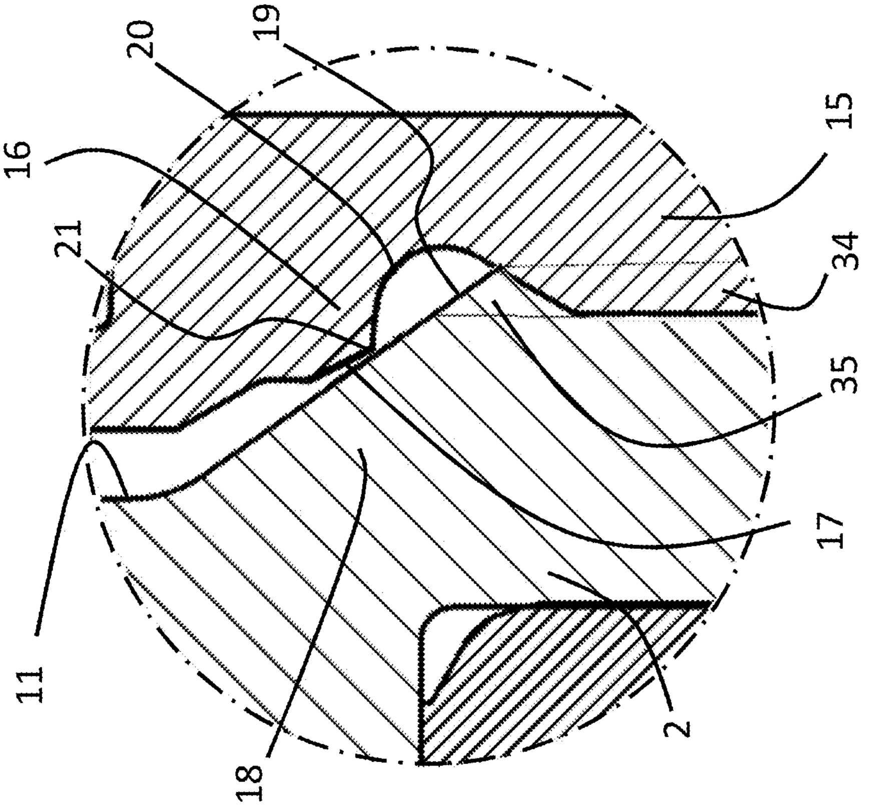
FIG. 4 is a detailed view of the contact between the sealing surface of the sealing sleeve and the contact surface of the base body of the cylinder head from FIG. 1 in the pre-assembled state of the sealing sleeve.
Figure 3:
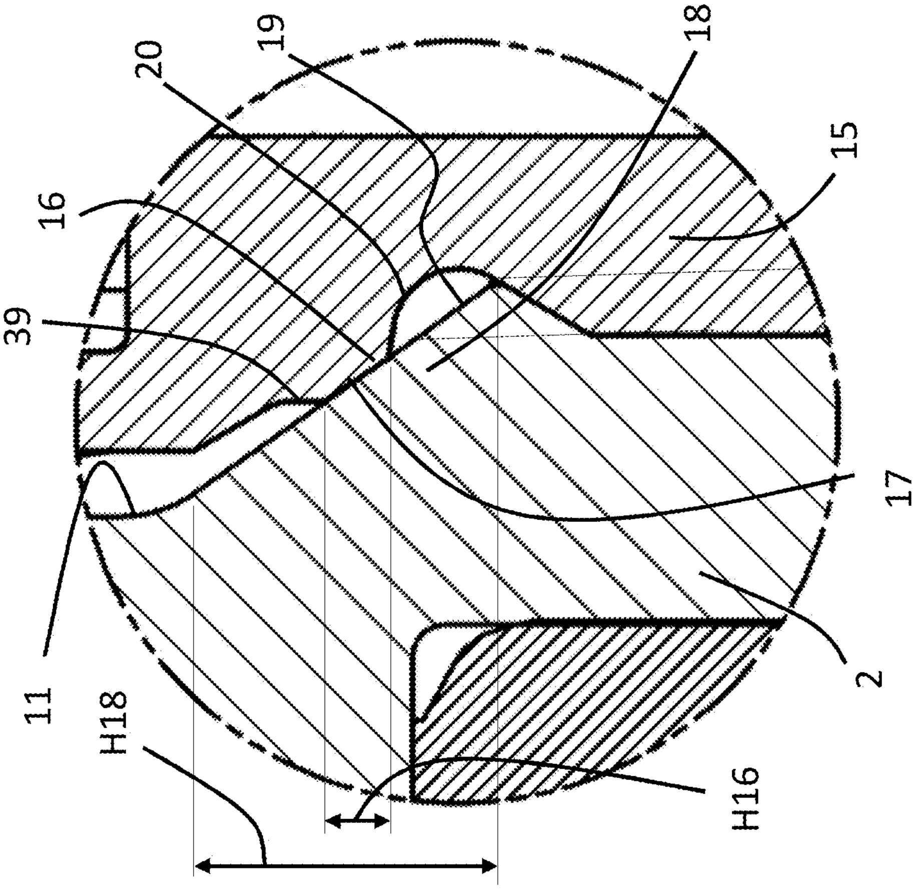
FIG. 3 is a detailed view of the contact between the sealing surface of the sealing sleeve and the contact surface of the base body of the cylinder head from FIG. 1 in the assembled state of the sealing sleeve.

FIGS. 1 to 3 each show the state of the cylinder head 1 with a fully assembled sealing sleeve 15, the sealing section 16 of which is plastically deformed. In the pre-assembled state shown in FIG. 4, the sealing section 16 has an outer conical shape and the contact section 18 has an inner conical shape. The cone angle of the sealing section 16 is smaller than the cone angle of the contact section 18. In this case, the cone angle of the sealing section 16 is 2 degrees smaller than the cone angle of the contact section 18. In principle, however, it is also conceivable that the cone angle of the sealing section 16 is between 1 and 10 degrees smaller than the cone angle of the contact section 18. When the sealing sleeve 15 is inserted into the hole 11, the circumferential edge 21, which is formed by the sealing surface 17 and the shoulder 20 in the form of the undercut, initially comes into line contact. Applying the clamping force therefore creates very high pressures in the area of edge 21, which leads to plastic deformation of the softer component of sealing sleeve 15 and base body 2. The softer component is flattened by the plastic deformation so that the line contact changes into a surface contact between sealing surface 17 and contact surface 19. Thus, by using a sealing sleeve with a smaller cone angle of the sealing section compared to the cone angle of the contact section, the necessary clamping force is reduced in order to achieve plastic deformation.

Between the coolant channel 14 and the second opening 13, the hole 11 has a first cylindrical section 22 and a second cylindrical section 23, which have different diameters. In the area of the first cylindrical section 22, a second seal 36 in the form of an O-ring is arranged between the sealing sleeve 15 and the base body 2. In the area of the second cylindrical section 23, a third seal 37 in the form of an O-ring is arranged between the sealing sleeve 15 and the base body 2. The second seal 36 and the third seal 37 thus together form a sealing arrangement that seals the side of the combustion chamber wall 5 and the coolant duct 14 from the oil chamber 4.

The sealing sleeve 15 is designed in two parts and comprises a flange element 24 and a sleeve element 25. In this respect, the sealing sleeve 15 can also be referred to as a sealing sleeve arrangement. The sleeve element 25 sits in the hole 11 and extends into the oil chamber 4. The sleeve element 25 comprises the sealing section 16 and the external thread 34. The sleeve element 25 is inserted into the flange element 24 so as to be axially displaceable in the direction of the longitudinal axis of the sealing sleeve 15, so that an axial overlap area is formed between the sleeve element 25 and the flange element 24. In the overlap area, a fourth seal 38 in the form of an O-ring is provided between the sleeve element 25 and the flange element 24, which seals the oil chamber 4 against the core of the sealing sleeve 15.

The flange element 24 sits in an insertion opening 26 of the cylinder head cover 3. The flange element 24 has a flange section 27, which is clamped to the cylinder head cover 3 via clamping means 28, 28'. A fifth seal 39 in the form of an O-ring is arranged between the flange element 24 and the insertion opening 26 of the cylinder head cover 3 in order to seal the oil chamber 4 from the outside of the cylinder head cover 3.

The division of the sealing sleeve 15 into the flange element 24 and the sleeve element 25 and their axially displaceable arrangement in relation to each other enables simple assembly of the sealing sleeve 15 in the cylinder head 1. First, the sleeve element 25 is screwed into the hole 11 of the base body 2. After the cylinder head cover 3 has been mounted on the base body 2, the flange element 24 can be pushed onto the end of the sleeve element 25 on the oil chamber side and then clamped against the cylinder head cover 3 using the clamping means 28. In the first embodiment of the cylinder head, the clamping force between the contact surface and the sealing surface thus results from the clamping of the screw connection between the sealing sleeve and the base body.

In this example, a spark plug 31 and a spark plug connector 32 of an ignition system 30 are inserted into the sealing sleeve 15. The spark plug 31 is screwed into the sealing sleeve so that a sealing pressure is achieved between the spark plug 31 and the sealing sleeve 15. Alternatively or in combination with this, sealing elements can be provided between the spark plug 31 and the sealing sleeve 15.

The ignition arrangement 30 also comprises an ignition coil head 29, which is mounted on the spark plug connector 32 and protrudes from the sealing sleeve 15. The ignition coil head 29 is clamped against the cylinder head cover 3 and the flange element 24 by clamping means 28', with a spacer sleeve 33 being arranged between the ignition coil head 29 and the flange element 24, through which the clamping means 28' is guided.

Alternatively, an injector arrangement can be inserted into the sealing sleeve 15 in a sealing manner instead of the ignition arrangement 30. The injector arrangement can be fastened in the same way as the ignition arrangement 30 via the clamping means 28'.

Figure 5:
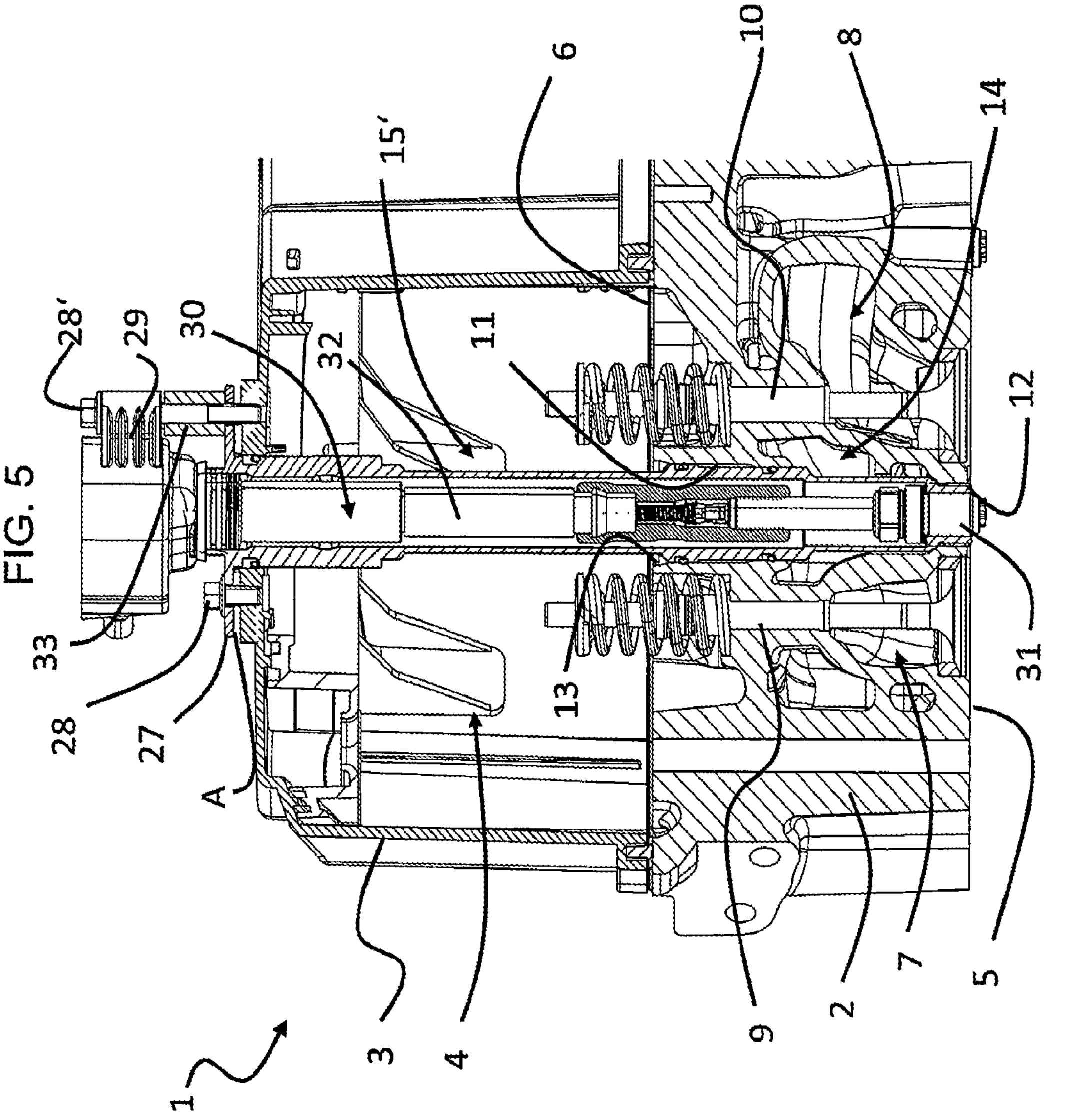
FIG. 5 is a sectional view of a cylinder head according to the disclosure according to a second embodiment.

FIG. 5 shows a cylinder head 1 according to the disclosure according to a second embodiment. This corresponds in large parts to the first embodiment, so that reference is made to the above description with regard to the similarities. The same or modified components are marked with the same reference signs as in FIGS. 1 to 4. The second embodiment of the cylinder head 1 differs from the first embodiment essentially in the one-piece structure of the sealing sleeve 15'. To apply the clamping force acting between the base body 2 and the sealing sleeve 15', the sealing sleeve 15' is first screwed with the external thread 34 into the internal thread 35 until the clamping force acting between the sealing surface 17 and the contact surface 19, which can also be referred to as the sealing force, reaches a first level. The clamping means 28 are then clamped between the flange section 27 of the sealing sleeve 15 until the clamping force reaches the desired level and at least one of the sealing section and the contact section is plastically deformed. As can be seen in FIG. 5, an axial distance A can be provided between the flange section 27 and the cylinder head cover 3 in the assembled state.

Figure 6:
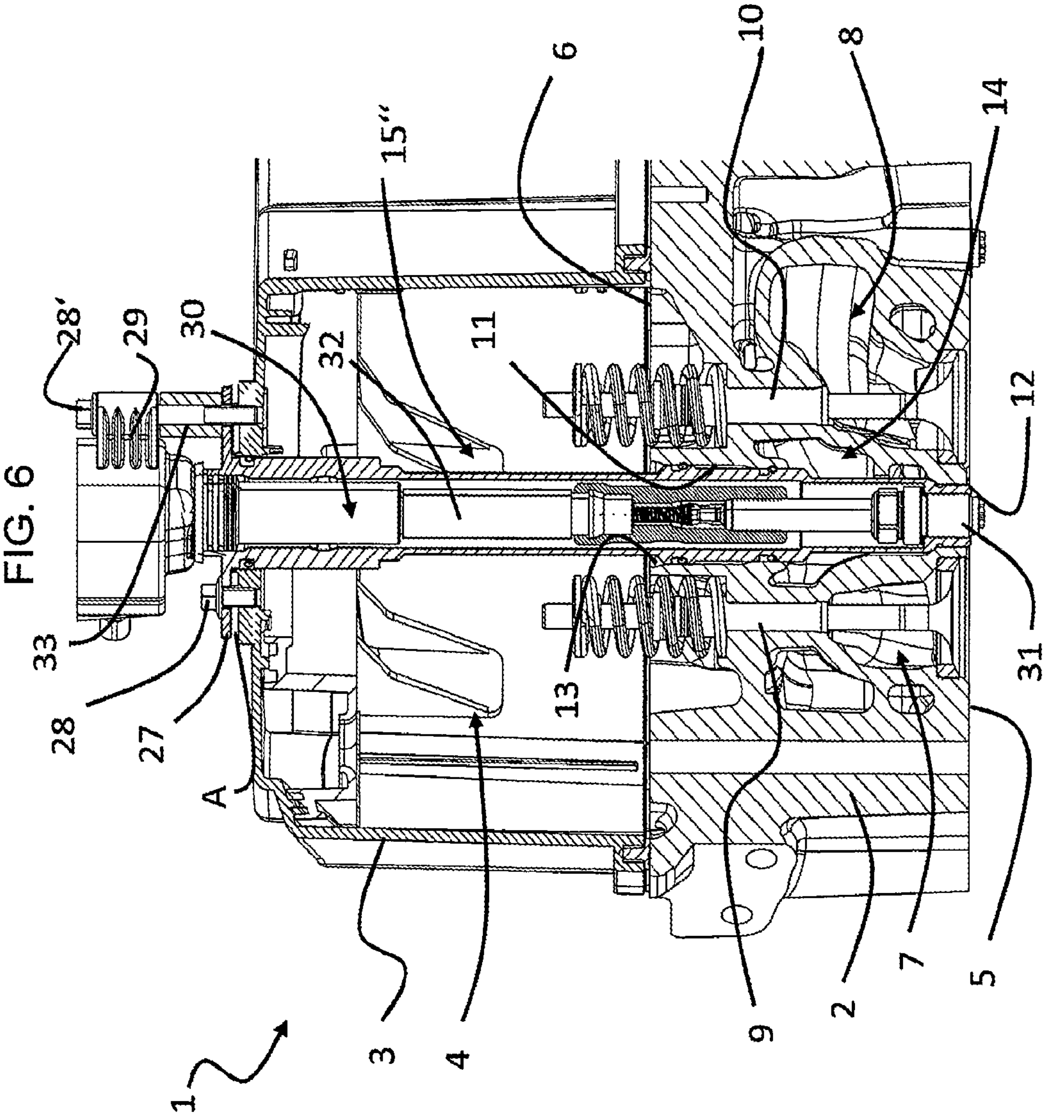
FIG. 6 is a sectional view of a cylinder head according to the disclosure according to a third embodiment.

FIG. 6 shows a cylinder head 1 according to the disclosure according to a third embodiment. This corresponds in large part to the second embodiment, so that reference is made to the above description with regard to the similarities. The same or modified components are marked with the same reference signs as in FIG. 5. The third embodiment of the cylinder head 1 differs from the second embodiment essentially in the absence of the external thread 34 in the sealing sleeve 15" and the internal thread 35 in the hole 11. In this case, the clamping force acting between the base body 2 and the sealing sleeve 15 is applied solely via the pre-tensioning means 28, which are arranged under pre-tension between the cylinder head cover 3 and the flange section 27.

Figure 7:
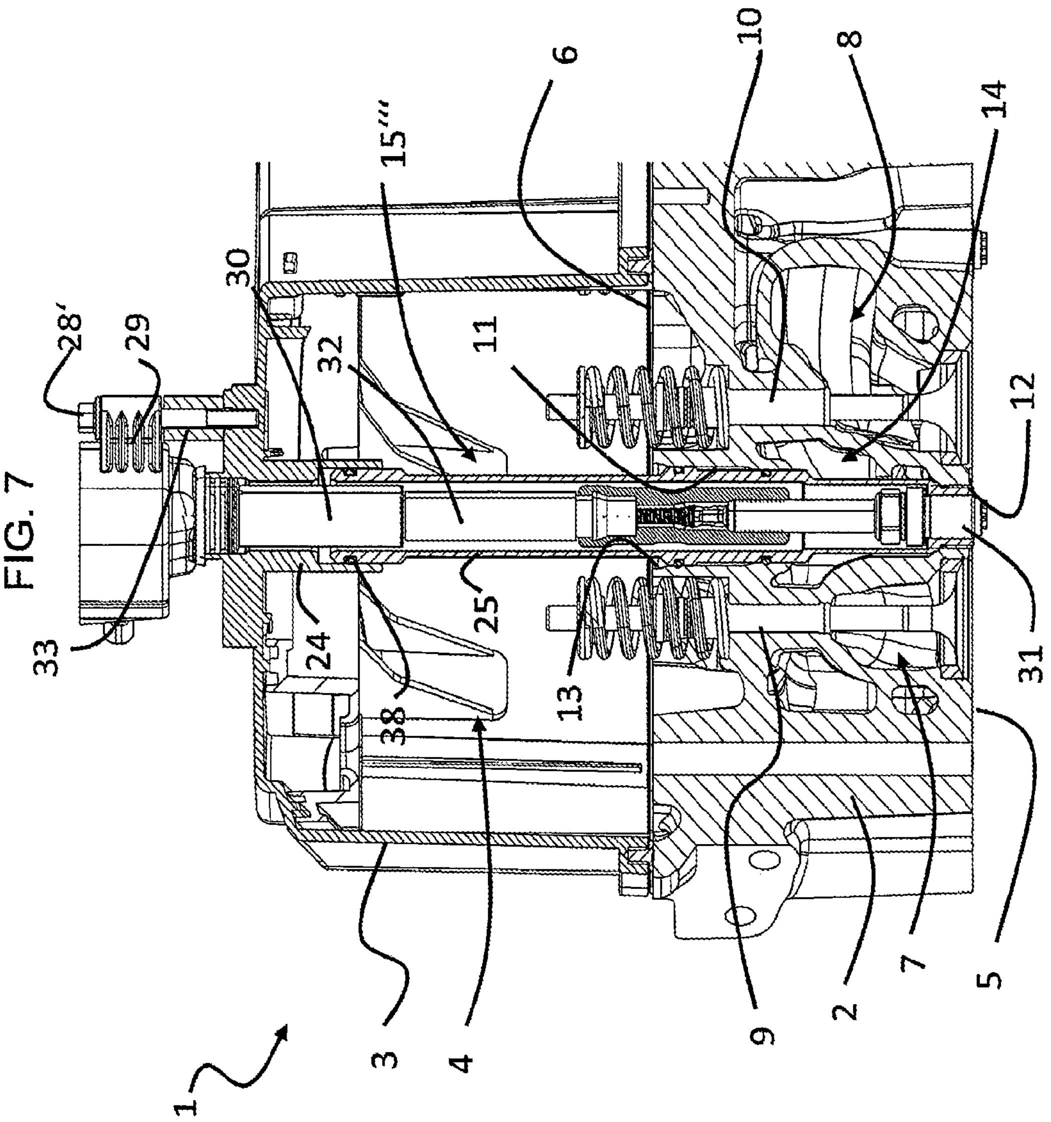
FIG. 7 is a sectional view of a cylinder head according to the disclosure according to a fourth embodiment.

FIG. 7 shows a cylinder head 1 according to the disclosure according to a fourth embodiment. This corresponds in large parts to the first embodiment, so that reference is made to the above description with regard to the similarities. The same or modified components are marked with the same reference signs as in FIGS. 1 to 4. The fourth embodiment of the cylinder head 1 differs from the first embodiment essentially in the integration of the flange element 24 into the cylinder head cover 3. In this case, the flange element 24 has been manufactured integrally with the rest of the cylinder head cover 3 in a casting process. To apply the clamping force acting between the base body 2 and the sealing sleeve 15", the sleeve element 25 is screwed with the external thread 34 into the internal thread 35 until the clamping force acting between the sealing surface 17 and the contact surface 19, which can also be referred to as the sealing force, reaches the desired level and at least one of the sealing section and the contact section is plastically deformed. The cylinder head cover 3 is then placed on the base body 2 so that the sleeve element 25 is seated in the flange element 24 and is then firmly connected to the base body 2 via connecting means not shown.

The invention claimed is:

1. A cylinder head for an internal combustion engine with a combustion chamber, comprising:

a base body with a combustion chamber wall for closing off the combustion chamber of the internal combustion engine, wherein the base body has a hole which penetrates the combustion chamber wall with a first opening, wherein the base body comprises an abutment section with a tapering inner contact surface; and a sealing sleeve, which has a sealing section with a tapered outer sealing surface, wherein the sealing sleeve and the base body are clamped together in such a way that the tapering inner contact surface and the tapered outer sealing surface are in sealing contact establishing a first seal, wherein at least one of the abutment section and the sealing section is at least partially plastically deformed.

2. The cylinder head according to claim 1, wherein the sealing sleeve has an external thread which engages in an internal thread of the hole of the base body, so that the sealing sleeve and the base body are clamped together in such a way that the contact surface and the sealing surface are in sealing contact.

3. The cylinder head according to claim 1, wherein an extension of the sealing section with respect to a longitudinal axis of the hole is smaller than an extension of the abutment section.

4. The cylinder head according to claim 1, wherein the sealing sleeve has a shoulder in the form of an undercut which adjoins the sealing section at a narrower end.

5. The cylinder head according to claim 1, further comprising a cylinder head cover, which is connected to the base body, so that an oil chamber is formed between the cylinder head cover and the base body, wherein the hole penetrates with a second opening an oil chamber wall of the base body facing the oil chamber and the sealing sleeve extends into the oil chamber.

6. The cylinder head according to claim 5, wherein the cylinder head cover comprises an insertion opening, wherein the sealing sleeve extends through the oil chamber and the insertion opening.

7. The cylinder head according to claim 5, wherein the sealing sleeve comprises a flange element and a sleeve element with the sealing section, which engage in one another displaceably in the direction of a longitudinal axis of the sealing sleeve, wherein the flange element is designed in one piece with the cylinder head cover.

8. The cylinder head according to claim 1, wherein the hole extends through a coolant channel of the base body.

9. The cylinder head according to claim 8, wherein the contact section is arranged between the first opening penetrating the combustion chamber wall and the coolant channel of the base body.

10. The cylinder head according to claim 8, wherein a second seal and a third seal are provided between the sealing sleeve and the base body, which are each arranged between the coolant channel and a second opening of the hole.

11. The cylinder head according to claim 10, wherein the sealing sleeve comprises a flange element with the flange portion and a sleeve element with the sealing section, which engage in one another displaceably in a direction of a longitudinal axis of the sealing sleeve, wherein a fourth seal is provided between the flange element and the sleeve element.

12. The cylinder head according to claim 1, wherein the sealing sleeve comprises a flange section, via which the sealing sleeve is connected to the cylinder head cover, so that the sealing sleeve is clamped to the base body in such a way that the contact surface and the sealing surface are in sealing contact.

13. The cylinder head according to claim 12, wherein an injector arrangement or a spark plug arrangement is accommodated in the sealing sleeve, wherein the injector arrangement or the spark plug arrangement is connected to the cylinder head cover together with the flange section via a clamp.

14. A sealing sleeve configured for sealing a cylinder head, which has in a base body a hole with a contact section with an inner conical contact surface, relative to a combustion chamber of an internal combustion engine, wherein the sealing sleeve has an outer conical sealing surface with a cone angle which is smaller than a cone angle of the inner conical contact surface.

* * * * *